United States Patent
Rodniansky

(10) Patent No.: US 11,030,335 B2
(45) Date of Patent: *Jun. 8, 2021

(54) EFFECTIVELY VALIDATING DYNAMIC DATABASE QUERIES THROUGH DATABASE ACTIVITY MONITORING

(71) Applicant: INTERNATIONAL BUSINESS MACHINES CORPORATION, Armonk, NY (US)

(72) Inventor: Leonid Rodniansky, Allston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/528,361

(22) Filed: Jul. 31, 2019

(65) Prior Publication Data
US 2019/0354712 A1    Nov. 21, 2019

Related U.S. Application Data

(63) Continuation of application No. 15/143,467, filed on Apr. 29, 2016, now Pat. No. 10,417,441.

(51) Int. Cl.
*G06F 21/62* (2013.01)
*H04L 29/06* (2006.01)

(52) U.S. Cl.
CPC ...... *G06F 21/6227* (2013.01); *H04L 63/1425* (2013.01); *H04L 63/205* (2013.01)

(58) Field of Classification Search
CPC ............ G06F 21/6227; H04L 63/1425; H04L 63/205
See application file for complete search history.

(56) References Cited

U.S. PATENT DOCUMENTS

| | | | |
|---|---|---|---|
| 7,437,362 B1 | 10/2008 | Ben-Natan | |
| 7,603,358 B1 * | 10/2009 | Anderson | G06F 21/6218 |
| 7,933,994 B1 | 4/2011 | Mangal et al. | |
| 8,200,527 B1 | 6/2012 | Thompson et al. | |
| 8,306,999 B2 * | 11/2012 | Gass, III | G06F 21/6227 |
| | | | 707/781 |

(Continued)

OTHER PUBLICATIONS

"List of IBM Patents or Patent Applications Treated as Related", dated Aug. 20, 2019, 2 pages.

(Continued)

*Primary Examiner* — Lynn D Feild
*Assistant Examiner* — Viral S Lakhia
(74) *Attorney, Agent, or Firm* — Jeffrey S. Labaw; Amy J. Pattillo

(57) ABSTRACT

A computer system, in response to intercepting a database server response with a result set issued by a database server in response to a database query received by the database server, extracts a selection of data from the result set, the selection of data identifying dynamic query elements of the dynamic database query as constructed by the database server at runtime. The database activity monitoring service determines whether the dynamic query elements comply with any security policies. The database activity monitoring service, in response to determining that the dynamic query elements fail to comply with any security policies, issues a security alert.

20 Claims, 7 Drawing Sheets

(56) References Cited

U.S. PATENT DOCUMENTS

| | | | |
|---|---|---|---|
| 8,474,031 B2* | 6/2013 | Vennelakanti | G06F 21/6218 726/11 |
| 8,578,487 B2* | 11/2013 | Soeder | G06F 21/6227 726/22 |
| 8,583,666 B2 | 11/2013 | Ben-Natan et al. | |
| 8,589,422 B2 | 11/2013 | Ben-Natan et al. | |
| 8,515,943 B2 | 12/2013 | Merz et al. | |
| 8,606,804 B2 | 12/2013 | Merz et al. | |
| 8,631,033 B2* | 1/2014 | Anderson | G06F 16/248 707/770 |
| 8,635,660 B2 | 1/2014 | Ng et al. | |
| 8,676,846 B2 | 3/2014 | Pooley et al. | |
| 8,725,857 B2 | 5/2014 | Brown et al. | |
| 8,732,856 B2* | 5/2014 | Sack | H04L 63/105 726/30 |
| 8,844,013 B2* | 9/2014 | Vangpat | H04L 63/0815 726/8 |
| 8,844,028 B1 | 9/2014 | Cheng | |
| 8,977,853 B2* | 3/2015 | Bassu | H04L 9/3228 713/168 |
| 8,990,883 B2* | 3/2015 | Kapoor | G06F 21/51 726/1 |
| 9,058,353 B2* | 6/2015 | Muller | G06F 16/24549 |
| 9,177,293 B1 | 11/2015 | Gagnon et al. | |
| 9,253,213 B2 | 2/2016 | Rodniansky | |
| 9,323,621 B2 | 4/2016 | Anderson et al. | |
| 9,390,083 B2* | 7/2016 | Ben-Natan | G06F 11/3672 |
| 9,426,180 B2* | 8/2016 | Brookins | H04L 67/20 |
| 9,454,576 B1* | 9/2016 | Kapoor | G06F 16/24564 |
| 9,602,529 B2 | 3/2017 | Jones et al. | |
| 9,787,726 B2 | 10/2017 | Russell et al. | |
| 10,430,430 B2* | 10/2019 | Muller | G06F 16/284 |
| 2008/0016122 A1 | 1/2008 | Liu et al. | |
| 2010/0095197 A1* | 4/2010 | Klevenz | G06F 16/972 715/234 |
| 2010/0250625 A1 | 9/2010 | Olenick et al. | |
| 2012/0162701 A1 | 6/2012 | Villwock | |
| 2013/0073576 A1 | 3/2013 | Lillethun et al. | |
| 2013/0246995 A1* | 9/2013 | Ferrao | G06F 8/35 717/104 |
| 2013/0298192 A1* | 11/2013 | Kumar | G06F 21/52 726/3 |
| 2013/0312092 A1 | 11/2013 | Parker | |
| 2014/0052749 A1 | 2/2014 | Rissanen | |
| 2014/0082376 A1 | 3/2014 | Roden et al. | |
| 2014/0096036 A1 | 4/2014 | Mohler | |
| 2014/0165133 A1 | 6/2014 | Foley et al. | |
| 2014/0165206 A1 | 6/2014 | Hadley | |
| 2014/0189776 A1* | 7/2014 | Diehl | H04L 41/145 726/1 |
| 2014/0279808 A1* | 9/2014 | Strassner | G06Q 10/10 706/47 |
| 2014/0280287 A1 | 9/2014 | Ganti et al. | |
| 2014/0282831 A1* | 9/2014 | Pedroza | H04L 63/20 726/1 |
| 2014/0283115 A1 | 9/2014 | Ben-Natan | |
| 2015/0150075 A1* | 5/2015 | Vahlis | G06F 21/602 726/1 |
| 2015/0213017 A1 | 7/2015 | Behne | |
| 2015/0227630 A1 | 8/2015 | Solheim et al. | |
| 2015/0248559 A1 | 9/2015 | Madou et al. | |
| 2016/0004746 A1* | 1/2016 | Wilking | G06F 16/24537 707/714 |
| 2016/0004869 A1 | 1/2016 | Ismael et al. | |
| 2016/0036812 A1 | 2/2016 | Rodniansky | |
| 2016/0036841 A1* | 2/2016 | Rodniansky | G06F 16/951 713/187 |
| 2016/0112538 A1* | 4/2016 | Wo | G06F 21/552 709/225 |
| 2016/0182559 A1* | 6/2016 | Francy | H04L 63/1425 726/1 |
| 2016/0217423 A1* | 7/2016 | Magnan | G06F 16/22 |
| 2016/0226922 A1* | 8/2016 | Russell | H04L 65/1069 |
| 2016/0328449 A1* | 11/2016 | Fa | G06F 16/24564 |
| 2017/0068806 A1 | 3/2017 | Kisters | |
| 2017/0220798 A1* | 8/2017 | Madou | G06F 21/6227 |
| 2017/0318027 A1 | 11/2017 | Rodniansky | |

OTHER PUBLICATIONS

Mamadhan et al, "SQLStor: Blockage of Stored Prcoedure SQL Injection Attack Using Dynamic Query Structure Validation", International Journal of Distributed and Parallel systems, 2012, 7 pages.

Kumar et al, "Use of Tokenization to Detect and Prevent SQL Injection Attacks", International Journal of Science Technology and Engineering, vol. 2, Issue 1, Jul. 2015, 7 pages.

Smirnov, Val, "How easy is it really to track unauthorized sensitive data usage by DAM solution?", accessed online via <https://www.linkedin.com/pulse/how-easy-really-track-unauthorized-sensitive-data-usage-val-smirnov?trk=prof-post3.SummaryofInvention:Brieflydescribethecoreideaofyourinvention> as of Apr. 12, 2016, 27 pages.

"IBM Security Guardium Data Activity", accessed online via <http://www-03.ibm.com/software/products/en/ibm-security-guardium-data-activity-monitor> as of Apr. 12, 2016, 1 page.

"Use Guardium Outlier Detection to Detect Hidden Threats", accessed online via <http://www.ibm.com/developerworks/library/se-guardium-outlier-hidden-threats-trs/> as of Apr. 14, 2016, 18 pages.

Office Action, dated Jun. 6, 2018, U.S. Appl. No. 15/143,467, filed Apr. 29, 2016, In re Rodniansky, available via PAIR/IFW, 29 pages.

Notice of Allowance, dated Nov. 16, 2018, U.S. Appl. No. 15/143,467, filed Apr. 29, 2016, In re Rodniansky, available via PAIR/IFW, 37 pages.

Notice of Allowance, dated May 6, 2019, U.S. Appl. No. 15/143,467, filed Apr. 29, 2016, In re Rodniansky, available via PAIR/IFW, 14 pages.

* cited by examiner

USER INTERFACE 502

```
1> exec unsecure_proc 'SELECT * FROM ','RET'
2> go
    secret1         secret2
    -----------     -----------
    111             222
    333             444
    555             666
    777             888
    999             000
    aaa             bbb
    ccc             ddd
    eee             fff
```

DATABASE PROTOCOL PACKET 504

```
00000000:04 01 01 08 00 00 00 00 61 5e 00 00 00 02 00 00   .......a^......
00000010:0b 47 75 61 72 64 69 75 6d 5f 51 41 03 64 62 6f   .Guardium_QA.dbo
00000020:06 53 45 43 52 45 54 07 73 65 63 72 65 74 31 10   .SECRET.secret1.
00000030:00 00 00 02 00 00 00 af 3c 00 00 00 00 00 0b 47   ........<......G
00000040:75 61 72 64 69 75 6d 5f 51 41 03 64 62 6f 06 53   uardium_QA.dbo.S
00000050:45 43 52 45 54 07 73 65 63 72 65 74 32 10 00 00   ECRET.secret2...
00000060:00 02 00 00 00 af 3c 00 00 00 00 ae 02 00 00 00   ......<.........
00000070:d1 03 00 00 00 31 31 31 03 00 00 00 32 32 32 d1   .....111....222.
00000080:03 00 00 00 33 33 33 03 00 00 00 34 34 34 d1 03   ....333....444..
00000090:00 00 00 35 35 35 03 00 00 00 38 38 38 d1 03 00   ...555....666..
000000a0:00 00 37 37 37 03 00 00 00 38 38 38 d1 03 00 00   ..777....888...
000000b0:00 39 39 39 03 00 00 00 30 30 30 d1 03 00 00 00   .999....000....
000000c0:61 61 61 03 00 00 00 62 62 62 d1 03 00 00 00 63   aaa....bbb.....c
000000d0:63 63 03 00 00 00 64 64 64 d1 03 00 00 00 65 65   cc....ddd.....ee
000000e0:65 03 00 00 00 66 66 66 ff 51 00 02 00 08 00 00   e....fff.Q......
000000f0:00 ff 41 00 02 00 08 00 00 00 79 00 00 00 00 fe    ..A......y....
00000100 : 08 00 02 00 08 00 00 00                          ....
```

SECURITY CONSTRUCT 506

"type=SELECT; column1=secret1; column2=secret2; database name=Guardium_QA; object owner=dbo; access object=SECRET"

SECURITY POLICY 206

SELECT access to table SECRET is not allowed for database user USERX

ALERT 508

QUERY: "exec unsecure_proc 'SELECT * FROM ', 'RET'" VIOLATES SECURITY POLICY: "SELECT access to table SECRET is not allowed for database user USERX"

EFFECTIVELY VALIDATING DYNAMIC DATABASE QUERIES THROUGH DATABASE ACTIVITY MONITORING

CROSS REFERENCE TO RELATED APPLICATIONS

This application is a continuation of commonly assigned U.S. patent application Ser. No. 15/143,467, filed Apr. 29, 2016, which is hereby incorporated herein by reference.

BACKGROUND

1. Technical Field

This invention relates in general to computer systems and more particularly to effectively validating dynamic structured query language (SQL) database queries through database activity monitoring.

2. Description of the Related Art

Many organizations, businesses, and individuals store data in various types of databases. Databases are generally managed through a database management system (DBMS). A DBMS is a system for creating and managing databases. Ensuring the security of data stored in various databases is becoming increasingly important. Database activity monitoring (DAM) is a database security technology that operates independently of the DBMS for intercepting and analyzing database traffic between database clients and a database server hosting a DBMS.

BRIEF SUMMARY

In one embodiment, a method is directed, in response to intercepting, by a computer system, a database server response with a result set issued from a database server in response to a database query received by the database server from a plurality of database clients, to extracting a selection of data from the result set, the selection of data identifying a plurality of dynamic query elements of a dynamic database query as constructed from the database query by the database server at runtime. The method is directed to determining, by the computer system, whether the plurality of dynamic query elements comply with a plurality of security policies by: creating, by the computer system, a security construct for the plurality of dynamic query elements from the extracted first selection of data based on particular database protocol rules specified for the database server from among a plurality of database protocol rules and validating, by the computer system, the security construct against the plurality of security policies specifying restrictions on a particular type of access operation to a particular database object by a particular user. The method is directed, in response to determining that the plurality of dynamic query elements fail to comply with at least one of the plurality of security policies, to issuing, by the computer system, a security alert.

In another embodiment, a computer system comprises at least one processor, at least one computer-readable memory, at least one computer-readable storage device, and program instructions, stored on the at least one storage device for execution by at least one processor via the at least one computer-readable memory. The stored program instructions comprise program instructions to, in response to intercepting a database server response with a result set issued from a database server in response to a database query received by the database server from a plurality of database clients, extracting a selection of data from the result set, the selection of data identifying a plurality of dynamic query elements of a dynamic database query as constructed from the database query by the database server at runtime. The stored program instructions comprise program instructions to determine whether the plurality of dynamic query elements comply with a plurality of security policies by: creating a security construct for the plurality of dynamic query elements from the extracted first selection of data based on particular database protocol rules specified for the database server from among a plurality of database protocol rules and validating the security construct against the plurality of security policies specifying restrictions on a particular type of access operation to a particular database object by a particular user. The stored program instructions comprise program instructions to, in response to determining that the plurality of dynamic query elements fail to comply with at least one of the plurality of security policies, issue a security alert.

In another embodiment, a computer program product comprises at least one computer-readable storage device and program instructions, stored on the at least one computer-readable storage device. The stored program instructions comprise program instructions to, in response to intercepting a database server response with a result set issued from a database server in response to a database query received by the database server from a plurality of database clients, extracting a selection of data from the result set, the selection of data identifying a plurality of dynamic query elements of a dynamic database query as constructed from the database query by the database server at runtime. The stored program instructions comprise program instructions to determine whether the plurality of dynamic query elements comply with a plurality of security policies by: creating a security construct for the plurality of dynamic query elements from the extracted first selection of data based on particular database protocol rules specified for the database server from among a plurality of database protocol rules and validating the security construct against the plurality of security policies specifying restrictions on a particular type of access operation to a particular database object by a particular user. The stored program instructions comprise program instructions to, in response to determining that the plurality of dynamic query elements fail to comply with at least one of the plurality of security policies, issue a security alert.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 5 is one illustrative example of the result set, returned by a database server running a dynamic SQL query, intercepted and analyzed by a DAM service, wherein the DAM service correctly detects, from the result set to the dynamic SQL query, the violation of the security policies by the dynamic SQL query;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
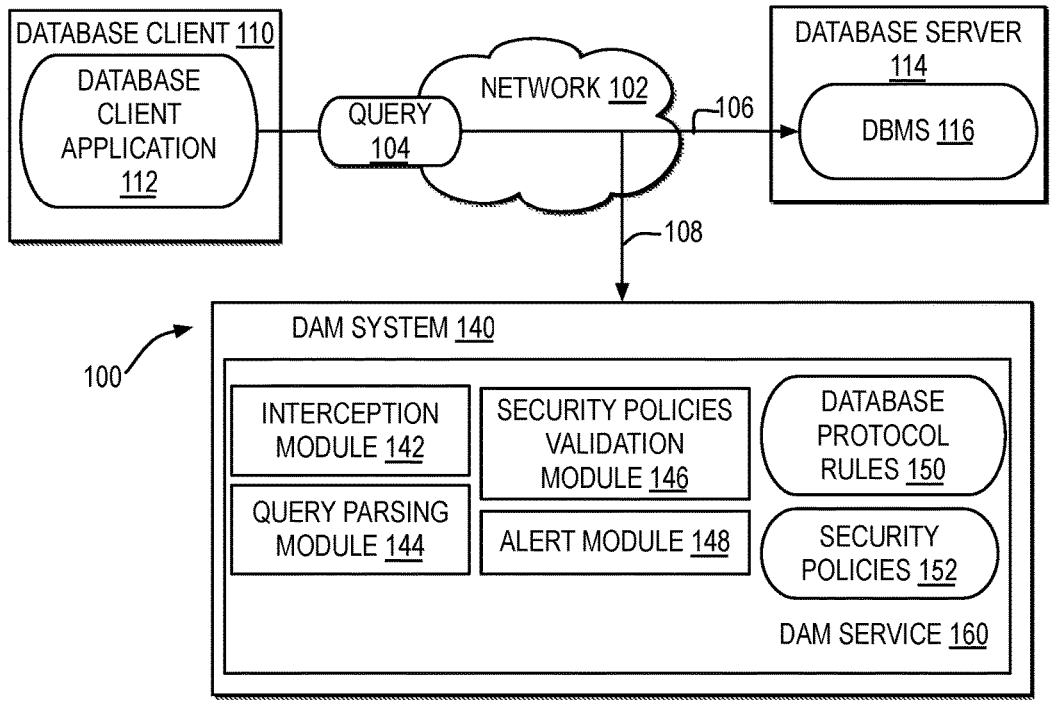
FIG. 1 is a block diagram illustrating one example of a database activity monitoring (DAM) service operating independently of a database server for intercepting and analyzing database queries between database clients and the database server to determine whether each database query validates against security policies.

FIG. 1 is a block diagram illustrating one example of a database activity monitoring (DAM) service operating independently of a database server for intercepting and analyzing database queries between database clients and the database server to determine whether each database query validates against security policies.

In one example, a network environment 100 includes a database client 110, a database server 114, and a database activity monitoring (DAM) system 140. In one example, database client 110, database server 114, and DAM system 140 may be communicatively connected via a network 102 that may include one or more types of networks including, but not limited to, a local area network (LAN), a wide area network (WAN), and may include wired, wireless, fiber optic, or any other type of connection. In additional or alternate examples, network environment 100 may include direct, non-network connections between one or more of database client 110, database server 114, and DAM system 140.

In one example, database client 110 may function as a database client by hosting a database client application 112 for managing communications with a DBMS 116 hosted by database server 114. In one example, database client application 112 may generate and submit database queries, such as a query 104, to database server 114. In one example, query 104, as transmitted from database client application 112 to database server 114, may represent one or more database protocol packets that include statements for a database query. In one example, database server 114 may represent one or more systems providing database services to one or more client systems or client application by through DBMS 116.

In one example, DBMS 116 may represent system software for creating and managing one or more databases. In one example, database services provided by DBMS 116 may include, but are not limited to, supporting the definition, creation, querying, updating, and administration of objects on a database. In one example, DBMS 116 may represent one or more of a general-purpose database management system and a special-purpose database management system. In one example, general-purpose database management systems may aim to meet the needs of multiple database clients and are tailored to meet the needs of multiple database clients with varying needs. In one example, special-purpose database management systems may perform a specific database task for database clients. DBMS 116 may manage one or more types of databases including, but not limited to, relational databases, object-oriented databases, graph databases, and network databases. Examples of DBMS 116 may include, but are not limited to, Microsoft SQL Server® and Microsoft Access®, available from Microsoft Corporation, Oracle® available from Oracle Corporation, and DB2® available from International Business Machines Corporation. DBMS 116 may interoperate by using standards such as, but not limited to, Structured Query Language (SQL), Open Database Connectivity (ODBC), or Java Database Connectivity (JDBC). In one example, the one or more database protocol packets may be written in a database protocol format specified according to the database protocol rules of the DBMS to which the database protocol packet is submitted. Different DBMSs may run according to different sets of database protocol rules.

In one example, network environment 100 includes DAM system 140, operating external to database server 114, for providing a database activity monitoring service 160 of database server 114. DAM service 160 may provide continuous monitoring of database activity of database server 114 in real-time. In one example, DAM service 160 may also refer to an external to database non-intrusive security mechanism (EDSM), enterprise database auditing, and real-time protection. Examples of DAM service 160 may include, but are not limited to, Infosphere Guardium® available from International Business Machines Corporation.

In one example, DAM service 160 includes an interception module 142 for implementing an interception based method of monitoring database activity between one or more database clients, such as database client 110, and database server 114. In an interception based method, DAM service 160 may intercept one or more database protocol packets identified as query 104 along the communication stream between database client 110 and database server 114, as illustrated by intercepted query 108, without interfering with the communication of query 104 to database server 114, as illustrated at reference numeral 106. In one example, interception module 142 may be implement monitoring agents at one or more points along the communication stream between database client application 112 and database server 114 to monitor for and intercept database protocol packets including database queries without requiring the participation of DBMS 116 and without relying on any form of native auditing or native logs of DBMS 116. For example, interception module 142 may intercept query 104 at one or more points such as, but not limited to, the database memory of database server 114, within network 108, at the operating system level, or at the level of database libraries. In additional or alternate embodiments, DAM service 160 may include one or more of a memory-based module and a log-based module for monitoring database activity between one or more database clients, such as database client 110, and database server 114. In additional or alternate embodiments, interception module 142 may implement additional or alternate methods by which database protocol packets are detected and intercepted.

In one example, DAM service 160 may implement or more additional functional modules to analyze intercepted query 108. In one example, DAM service 160 may include a query parsing module 144 that extracts a database query from the database protocol packets of intercepted query 108, parses the extracted database query to the database object level and creates a security construct from the parsed database objects according to database protocol rules 150. DAM service 160 may include a security policies validation module 146 that validates the possible database object access violation in the security construct against security policies 152. In one example, if the security construct does not validate against security policies 152, an alert module 148 of DAM service 160 handles sending an alert to an administrator or other entity indicating that intercepted query 108 has failed to validate against security policies 152. In one example, alert module 148 issues an alert to a database security administrator indicating that intercepted query 108 violates an established security policy.

In additional or alternate examples, DAM service 160 may include additional or alternate modules to interception module 142, query parsing module 144, security policies validation module 146, and alert module 148. In addition, in additional or alternate embodiments, one or more of interception module 142, query parsing module 144, security policies validation module 146, and alert module 148 may be distributed across different instances of DAM service 160 provided by one or more service providers.

In one example, database protocol rules 150 may specify one or more rules, specified for the database protocol packet of a particular type of database. In one example, the rules may include, but are not limited to, a type of operation or command identified in a query, a database object to be operated on by the operation, and a user identifier of the user requesting the query. In addition, additional rules may include, but are not limited to, identifiers for a service IP address, a client IP address, a client MAC, a network protocol used to access data, a database type, a service name for the name of a service providing data, a name of a database accessed, a source application used for the data access, an application user name, and operating system user, a database related field, an error code, an exception type, and a service IP address of the location of data accessed. In one example, database protocol rules 150 may also specify which particular dynamic query elements to parse from a database protocol packet to construct a security construct for a query according to database protocol rules 150. In additional or alternate examples, database protocol rules 150 may include additional or alternate rules.

In one example, security policies 152 may include one or more policies for determining whether to validate queries. In one example, an administrator or service may set each of the policies. In one example, each of the one or more policies may include one or more settings such as, but not limited to, an operation type setting specifying the type of operation access is or is not allowed for, an object setting specifying one or more particular database objects being acted upon by the operation, and a user setting specifying one or more user identifiers for users requesting the operation on the database object. In one example, examples of operations that may be restricted in security policies 152 include operations such as, but not limited to, create, select, update and delete. In additional or alternate examples, policy 220 may include additional or alternate types of settings.

In one example, DAM service 160 may be implemented to monitor and audit compliance control independent of native logging and audit functions of DBMS 116. DAM service 160 may be implemented to protect against internal or external threats by identifying unauthorized data access and providing alerts on changes to predetermined data to help ensure data integrity. DAM service 160 may provide continuous monitoring and real time security policies to protect data across an enterprise without changes or performance impact to data sources or applications. In addition, DAM service 160 may protect data wherever it resides within database server 114 and centralizes risk controls and analytics with scalable architecture that provides full visibility on data activity. DAM service 160 may be implemented to monitor and audit data activity associated with all data platforms and data access protocols. DAM service 160 may be implemented to enforce security policies 152 in real-time for various data access, change control, and user activities. DAM service 160 may create a centralized normalized repository of audit data for enterprise compliance, reporting, and forensics. DAM service 160 may support database monitoring for heterogeneous data environments including, but not limited to data warehouses, file applications and operating systems, including big data environments, such as Hadoop and NoSQL. DAM service 160 may be easily configured to adapt to changes in network environment 100. In additional or alternate examples, DAM service 160 may be implemented for additional or alternate types of monitoring and security functions.

In one example, query 104 may include a structured query language (SQL) query, based on a SQL statement, for accessing data in tables managed by DBMS 116. In one example SQL represents a standardized language for defining and manipulating data in a relational database. In one example, under a relational database model, the database in DBMS 116 is perceived as a set of tables, relationships are represented values in tables, and data is retrieved by using SQL statements to specify a result table that can be derived from one or more tables. In additional or alternate examples, query 104 may be defined in one or more additional or alternate languages or protocols for defining and manipulating data in a relational database or in other types of databases.

In one example, query 104 may include static SQL queries and dynamic SQL queries, in addition to other types of queries. In one example, static SQL queries are constructed before a program is run and therefore may include query elements that identify an operation, a database object, and a user in the database protocol packets passed in query 104. DAM service 160 may parse the static query elements in a static SQL query to the database object level, effectively validate database object access violations against security policies 152, and issue security policy violation alerts. For static SQL queries, at a database object level, the static SQL statement parsed from intercepted query 108 by DAM service 160 reflects the same static SQL statement that the database server 114 will run from query 104, such that the static SQL statement run by database server 114 based on query 104 is the same static SQL statement visible to and verified by DAM service 160.

In one example, there is a risk that DAM service 160 may not detect security violations in dynamic SQL queries from intercepted query 108 alone because a dynamic SQL statement is constructed at runtime by database server 114. In particular, dynamic SQL queries are constructed and executed on database server 114 at runtime, therefore there is a risk that the database protocol packets passed in query 104 to database server 114 and intercepted by DAM service 160 as intercepted query 108 will not identify the operation to be performed and the database object on which the operation will be performed. A first dynamic SQL statement visible to DAM service 160 in intercepted query 108 may be different, at a database object level, from a second dynamic SQL statement constructed and executed by database server 114 based on the first dynamic SQL statement in query 104. When query 104 includes SQL statements representing a dynamic SQL query, while DAM service 160 may parse the query elements to the database object level, DAM service 160 may validate database object accesses identified in intercepted query 108 as passing security policies 152, but not correctly detect the security violation that may occur based on query 104 because the violating operation and data object dynamically constructed and executed on database server 114 are not identified in query 104. In particular, DAM service 160, based on intercepted query 108 alone, may not correctly detect a violation of security policies 152 by a dynamic SQL query within intercepted query 108 because the dynamic SQL statement constructed and executed by database server 114 from the dynamic SQL query in query 104 is not visible to DAM service 160 from intercepted query 108 and is not verified by DAM service 160 based on intercepted query 108.

Figure 2:
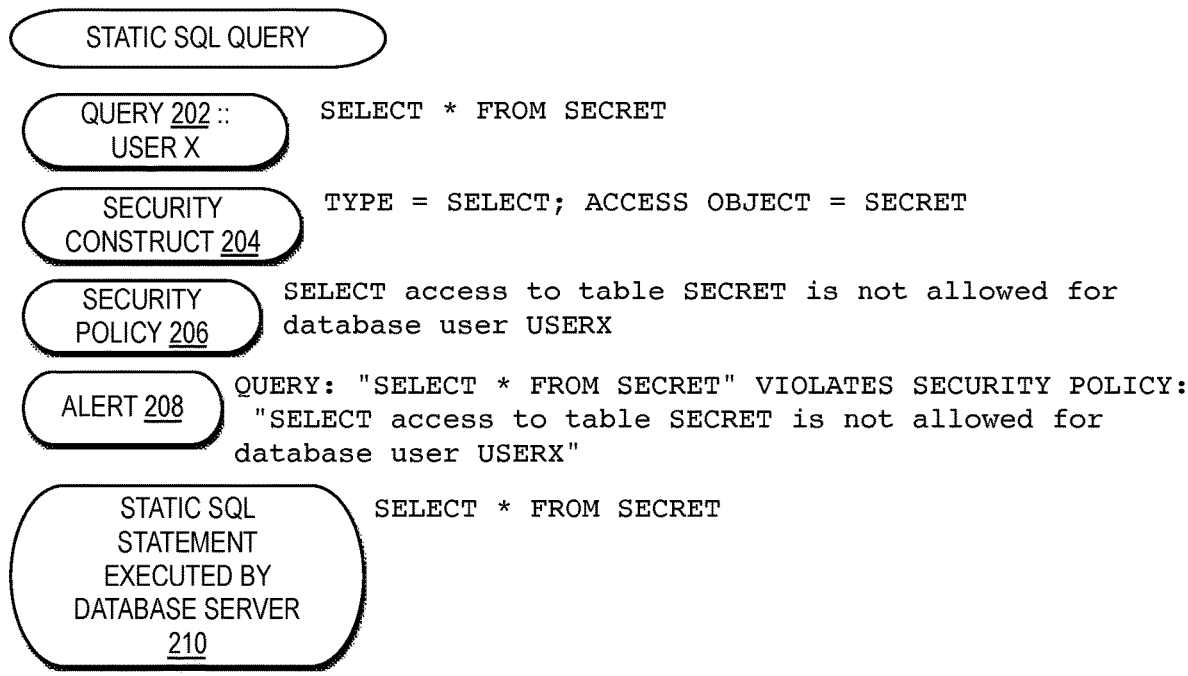
FIG. 2 is one illustrative example of a static SQL query intercepted and analyzed by a DAM service, wherein the DAM service correctly identifies that the requested database object access violates security policies.

FIG. 2 illustrates one illustrative example of a static SQL query intercepted and analyzed by a DAM service, wherein the DAM service correctly identifies that the requested database object access violates security policies.

In one example, a query 202 includes an example of a static SQL query statement sent by a "USERX" of "SELECT*FROM SECRET". In the example, intercept module 142 may intercept database protocol packets including the static query elements of query 202. Query parsing module 144 may parse the static query elements of query 202 from the database protocol packets, parse the operation type of "SELECT", the database object of "SECRET", and the user identifier of "USERX" and create a security construct 204, based on database protocol rules 150 of "type=SELECT; access object=SECRET". In one example, interception module 142 may initially intercept the userID on a database session level during database user authentication. Subsequently, all database client queries belong to the same database session associated with the intercepted userID.

In one example, a security policy 206 illustrates an example of a security policy within security policies 152. As illustrated, security policy 206 is "SELECT access to table SECRET is not allowed for database user USERX".

In one example, security policies validation module 146 validates security construct 204 against security policies 152 and correctly determines that query 202 violates security policy 206 because the type of operation, the database object to be operated on, and the user identifier are not allowed according to security policy 206. In particular, in the example in FIG. 2, a static SQL statement executed by the database server 210 is "SELECT*FROM SECRET" which matches, at a database object level, the static SQL statement in query 202, such that the static SQL statement run by database server 210 is the same static SQL statement visible to and verified by DAM service 160. In one example, alert module 148 issues an alert 208 indicating that query 202 violates security policy 206.

Figure 3:
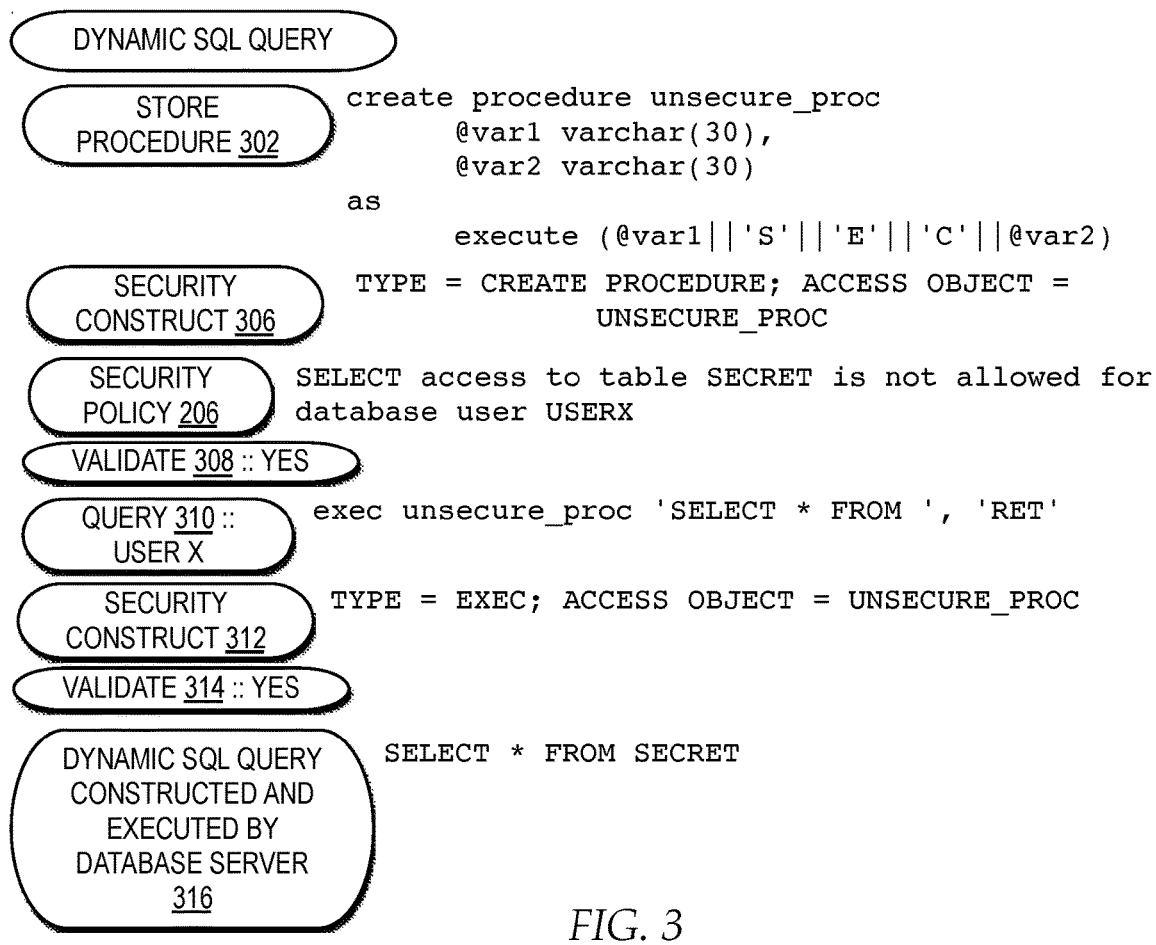
FIG. 3 is one illustrative example of a dynamic SQL query intercepted and analyzed by a DAM service, wherein the DAM service does not correctly detect a violation of the security policies from the dynamic SQL query because the SQL statement constructed and executed by a database server from the dynamic SQL query remains invisible to the DAM service and is not verified by the DAM service.

FIG. 3 illustrates one illustrative example of a dynamic SQL query intercepted and analyzed by a DAM service, wherein the DAM service does not correctly detect a violation of the security policies from the dynamic SQL query because the SQL statement constructed and executed by a database server from the dynamic SQL query remains invisible to the DAM service and is not verified by the DAM service.

In one example, in a first step of a dynamic SQL query, a database user "USERX" creates a store procedure 302:

```
create procedure unsecure_proc
    @var1 varchar(30),
    @var2 varchar(30)
as
    execute (@var1||'S'||'E'||'C'||@var2).
```

While the query 202 in FIG. 2 includes a specific database object of "SECRET", store procedure 302 does not use database objects. Instead, store procedure 302 may include placeholders, such as "@var1" and "@var2". Interception module 142 may intercept store procedure 302. In the example, query parsing module 144 may parse store procedure 302 into a security construct 306 of "TYPE=CREATE PROCEDURE; ACCESS OBJECT=UNSECURE_PROC". In the example, security policies validation module 146 validates security construct 306 against security policy 206 and determines that store procedure 302 does not violate security policy 206, as illustrated at reference numeral 308, because the type of operation "CREATE PROCEDURE"

and object operated on "UNSECURE_PROC" in security construct 306 do not match the type of operation "SELECT" and object operated on in "SECRET" in security policy 206.

Next, in one example, in a second step of a dynamic SQL query, database user "USERX" calls store procedure 302 through a query 310 of "exec unsecure_proc 'SELECT*FROM','RET'". In one example, from query 310 calling store procedure 302, DBMS 116 may dynamically construct and execute the query of "SELECT*FROM SECRET" by passing literals 'SELECT*FROM', 'RET' as the values for @var1 and @var2 in "@var1||'S'||'E'||'C'||@var2. In particular, in the example in FIG. 2, the SQL statements in store procedure 302 or query 310, which are visible to DAM service 160 in intercepted queries are different at a database object level from a dynamic SQL query constructed and executed by the database server 216 of "SELECT*FROM SECRET", which is constructed and executed based on store procedure 302 and query 310.

In the example, the dynamic SQL query of "SELECT*FROM SECRET", dynamically constructed by DBMS 116 from query 310, violates security policy 206, however query 310 will pass validation by DAM service 160 because the database object "SECRET" is not visible to DAM service 160 from query 310. In particular, in the example, interception module 142 may intercept database protocol packets including the dynamic query elements of query 310. Query parsing module 144 may parse the dynamic query elements of query 310 from the database protocol packets, parse the operation type of "EXEC", the database object of "UNSECURE_PROC", and create a security construct 312, based on database protocol rules 150 of "type=EXEC; access object=UNSECURE_PROC. In the example, security policies validation module 146 validates security construct 312 against security policies 206, and determines that query 310 does not violate security policy 206, as illustrated at reference numeral 314, because the database object to be operated on as identified in security construct 312 is "UNSECURE_PROC", not "SECRET" as identified in security policy 206. In the example, security policies validation module 146 does not detect the security violation that occurs based on query 310 because the violating operation and data object constructed and executed on database server 114 are not visible to DAM service 160 in query 310. In particular, DAM service 160, based on intercepted query 310, does not detect the violation of security policies 206 by query 310 because the dynamic SQL query "SELECT*FROM SECRET" that is dynamically constructed and executed by DBMS 116 from store procedure 302 and query 310 is invisible to DAM service 160 and is not verified by DAM service 160 from query 310.

Figure 4:
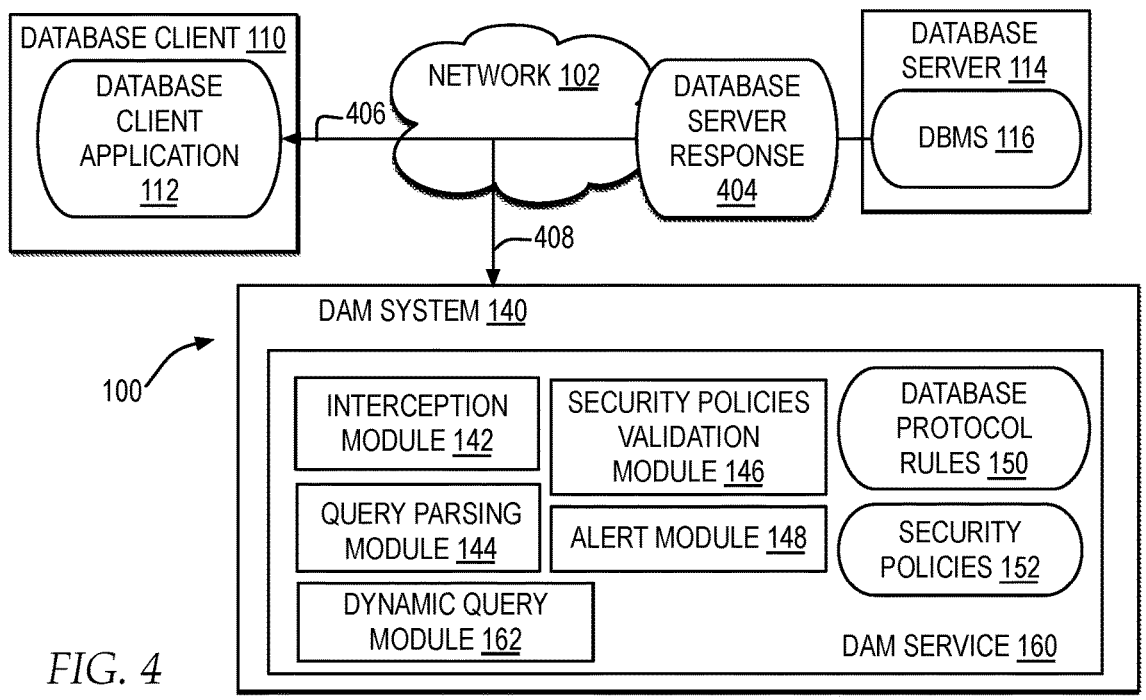
FIG. 4 is a block diagram illustrating one example of a DAM service operating independently of a database server for intercepting and analyzing database results returned from the database server to database clients to detect violations of security policies from dynamic database queries to the database server.

FIG. 4 illustrates a block diagram illustrating one example of a DAM service operating independently of a database server for intercepting and analyzing database results returned from the database server to database clients to detect violations of security policies from dynamic database queries to the database server.

In one example, in response to query 104, DBMS 116 may handle query 104 and generate a response for query 104 that is returned to database client 110 in a database server response 404. In one example, database server response 404 may represent one or more database protocol packets that include response data.

DAM service 160 may provide continuous monitoring of database activity of database server 114 in real-time, including monitoring of database responses to queries, such as database server response 404. In the example, DAM service 160 provides for monitoring of database responses through interception module 142. In one example, interception module 142 may intercepts database protocol packets for database server response 404, as intercepted response 408. In one example, as described with reference to FIG. 1, one or more methods may be selected and implemented by interception module 142 to monitor for, detect, and intercept database protocol packets.

In one example, to minimize processing overhead, a dynamic query module 162 of DAM service 160 may select to only call interception module 142 to intercept database server response 404 if security policies validation module 146 determines that the initial, related query 104 passes validation against security policies 152. In another example, dynamic query module 162 may select to only call interception module 142 to intercept database server response to query 104 if a log is updated to indicate that related query 104 has passed validation, whether by security policies validation module 146 or another validation module of a DAM service or of another type of service. In another example, dynamic query module 162 may set DAM service 160 to intercept database protocol packets for all database service responses.

Next, once interception module 142 intercepts database server response 404, dynamic query module 162 determines whether the database protocol packets for database server response 404 are a response for a dynamic query with a result set. In one example, database server response 404 may include database protocol packets with different types of data in different structure types, where one of the structures is a result set returned for a dynamic query. In one example, database protocol rules 150 may define the structure of a result set for a dynamic database query.

In one example, when database server 114 prepares database server response 404 to a dynamic SQL query, on a database protocol level database server 114 may return not only requested data, but a result set that includes a part that is visible to a user interface of database client application 112 and a part that is invisible to a user interface of database client application 112. In one example, the visible part of the result set is the data values and the invisible part of the result set is metadata describing retrieved data values.

In the example, the metadata in the result set include dynamic query elements that can be used as a base for creating a security construct related to the initial dynamic SQL query. In particular, the metadata in the result set may include dynamic query elements of the dynamic SQL query that were constructed and executed by database server 114. In one example, each type of DBMS may apply a separate type of protocol for setting the metadata and data values within a database protocol packet. In one example, if a particular database returns a result set without metadata, the dynamic query elements that are used as the basis for creating a security construct related to the initial dynamic SQL query may need to be accessed from a different data source.

If dynamic query module 162 detects a response for a dynamic query with a result set, query parsing module 144 is called to extract the metadata from the result set in the database protocol packets of intercepted response 408 and create a security construct from the dynamic query elements accessible within the extracted metadata according to database protocol rules 150. In one example, database protocol rules 150 may include specific rules for identifying dynamic query elements within the extracted metadata and creating the security construct. For example, database protocol rules 150 may specify rules for identifying a type of operation and database object accessed, and may also include rules for identifying data column identifiers, a database name identifier, and an object owner.

DAM service 160 may include security policies validation module 146 that validates the possible database object access violation in the security construct based on intercepted response 408 against security policies 152. In one example, if security policies validation module 146 determines that the security construct does not pass validation against security policies 152, an alert module 148 of DAM service 160 handles sending an alert to an administrator or other entity indicating that intercepted response 408 to query 104 has failed to validate against security policies 152. In one example, alert module 148 issues an alert to a database security administrator indicating that intercepted response 408 to query 104 violates an established security policy.

In one example, dynamic query module 162 may direct alert module 148 to issue an alert for query 104 that is specified to indicate that the alert is based on analysis of intercepted response 408, as distinguished from an alert issued for analysis of an intercepted query, and to indicate that the alert is for a dynamic database query, as indicated by the result set for a dynamic query identified in intercepted response 408. In one example, by distinguishing an alert based on an analysis of a query versus an alert based on an analysis of a response to a query, DAM service 160 may provide a system administrator or other security service alerts specified in a manner that allows for triggering additional security protocols based on the type of violations detected. In particular, while a DAM service may not impact the flow of queries and responses between database clients and database servers, other security services may dynamically select to restrict the flow of queries and responses between database clients and database services in some manner based on the type of alert issued by alert module 148.

In one example, as illustrated in FIGS. 1 and 3, DAM service 160 may determine, based the SQL statements of a dynamic SQL query, that the query does not violate security policies 152. However, as illustrated in FIG. 4, by creating a security construct from intercepted dynamic SQL query result set metadata within intercepted response 408, DAM service 160 may correctly detect, based on the database server response including a result set with metadata, that a dynamic SQL query does violate security policies 152. By correctly detecting that a dynamic SQL query violates security policies 152 based on an intercepted database server response, DAM service 160 provides additional security for monitoring access violations via dynamic SQL queries.

FIG. 5 illustrates an illustrative example of the result set, returned by a database server running a dynamic SQL query, intercepted and analyzed by a DAM service, wherein the DAM service correctly detects, from the result set to the dynamic SQL query, the violation of the security policies by the dynamic SQL query.

In one example, in response to the dynamic SQL query illustrated in FIG. 3, from the database user "USERX" issuing query 310, database server 114 returns database server response 404 including a result set in the form of a database protocol packet. In one example, a database protocol packet 504 represents database server response 404. In one example, database protocol packet 504 may include metadata values at the beginning, which are invisible, and data values at the end, which are visible. For example, database protocol packet 504 may include metadata values of " . . . aˆ . . . Guardium_QA.dbo.SECRET. secret1 . . . < . . . Guardium_QA.dbo.SECRET.secret2 . . . < . . . and data values of " . . . 111 . . . 222 . . . 333 . . . 444 . . . 555 . . . 666 . . . 777 . . . 888 . . . 999 . . . 000 . . . aaa . . . bbb . . . ccc . . . ddd . . . eee . . . fff." In one example, a user interface 502 illustrates an interface view by "USERX" of query 310 issued by database client application 112 and of the visible portions of the result set, of the data values returned within the result set of database server response 404.

In one example, query parsing module 144 extracts the metadata of database protocol packet 504 and creates a security construct 506 from the extracted metadata according to database protocol rules 150. In one example, security construct 506 illustrates a security construct created from the extracted metadata by query parsing module 144 of "type=SELECT; column1=secret; column2=secret; database name=Guardium_QA; object owner=dbo; access object=SECRET". In the example, the operation type of "SELECT" is identified within the metadata according to database protocol rules 150. In the example, query parsing module 144 is also able to extract column identifiers, a database name identifier, an object name identifier, and object owner identifier, and an accessed object from the string of data in the metadata of database protocol packet 504 according to database protocol rules 150. In the example, as previously described, interception module 142 may initially intercept the userID on a database session level during database user authentication. Subsequently, all database client queries and database server responses belong to the same database session associated with the intercepted userID.

In the example, security policies validation module 146 validates security construct 506 against security policy 206 and determines that database protocol packet 504, returned for query 310, violates security policy 206 because the type of operation, the database object to be operated on, and the user identifier are not allowed according to security policy 206. In one example, alert module 148 issues an alert 508 indicating that query 310 violates security policy 206.

In the example, while query 310 passed validation against security policy 206, as illustrated in FIG. 3, database protocol packet 504 related to query 310 fails validation against security policy 206. In the example, the SQL statement of query 310 is dynamically constructed and executed by DBMS 116 during runtime, such that the type of access operation and the database object to access are only determined by DBMS 116 after query 310 is intercepted by DAM service 160. In the example, query 310 passes validation by security policies validation module 146 based on the data extracted from query 310 before construction and execution by DBMS 116. In the example, security policies validation module 146 of DAM service 160 is able to effectively determine whether query 310 passes validation against security policy 206 after DBMS 116 constructs and executes query 310 at runtime by extracting information about the operation access type and about the database object that is accessed from the metadata in database protocol packet 504.

Figure 6:
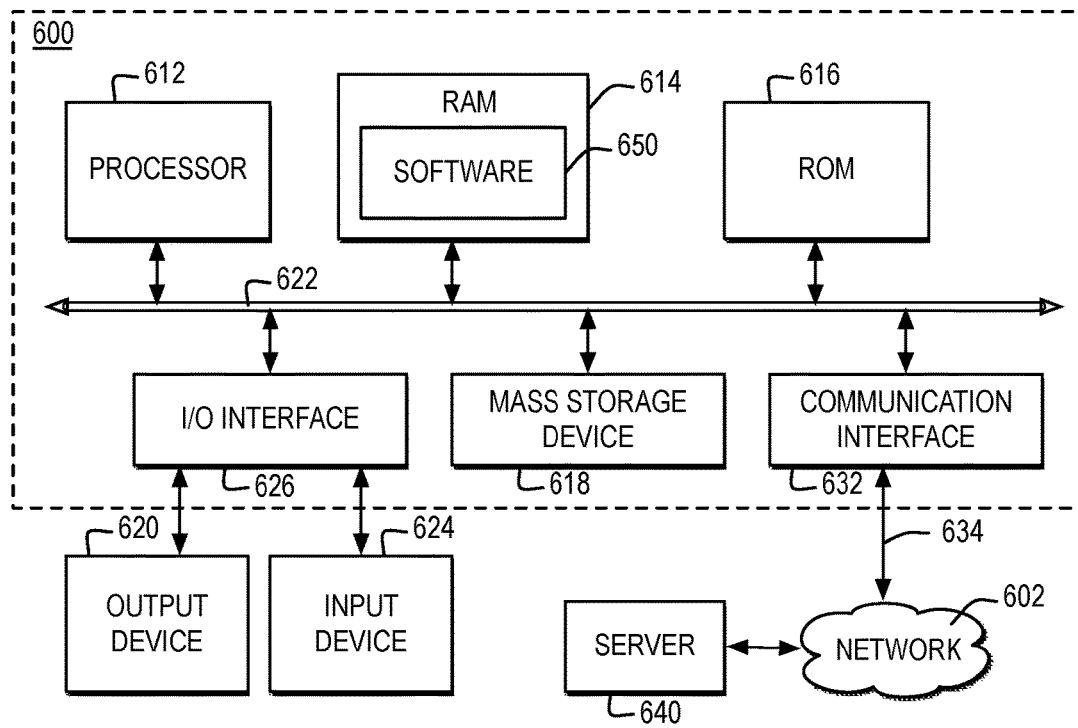
FIG. 6 is a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602. In one example, network 602 may represent an example of network 102.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power.

Processor 612 may be at least one general-purpose processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment. In various embodiments, software 650 may also include one or more instances of database client application 112, DBMS 116, and DAM service 160.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

Figure 8:
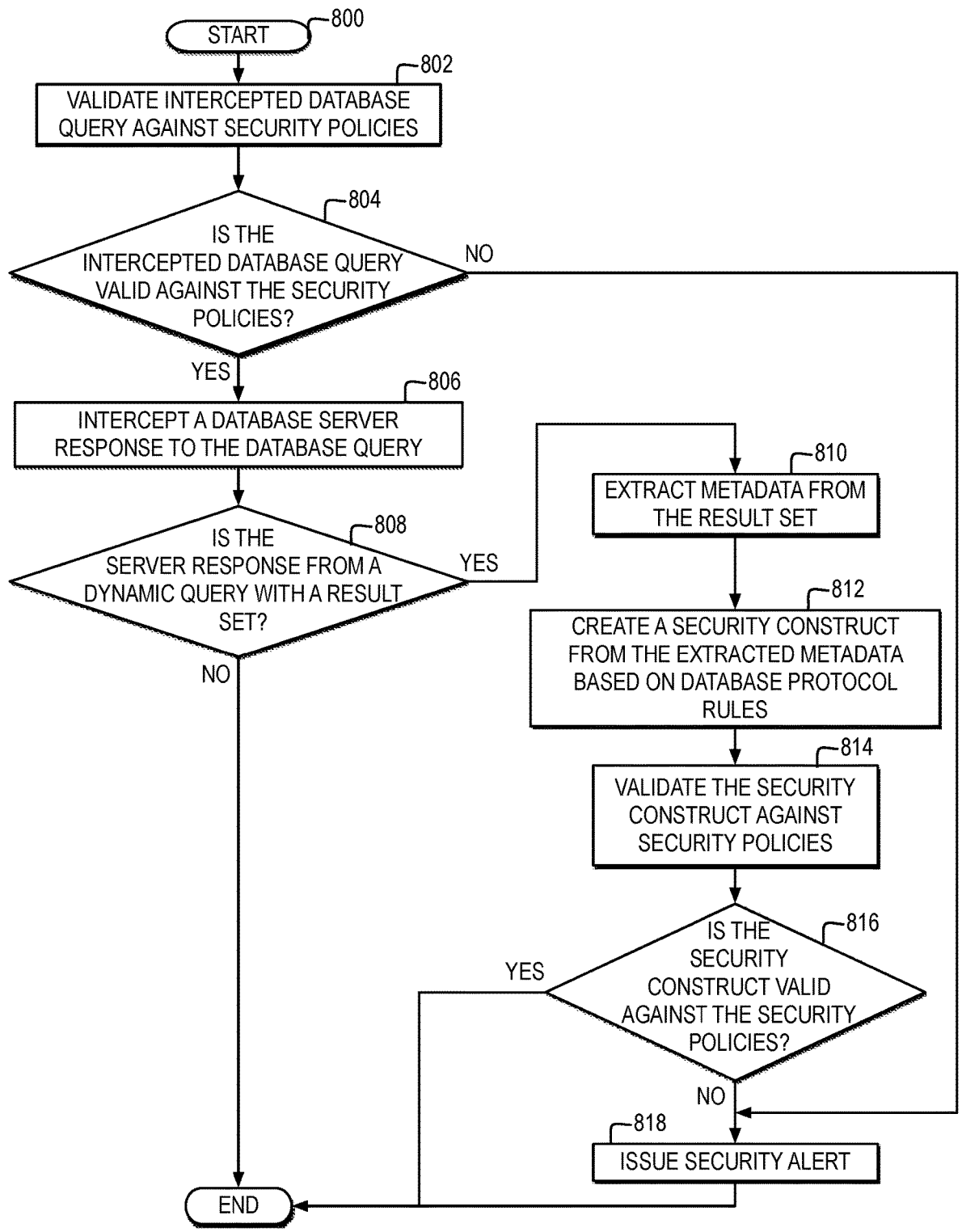
FIG. 8 is a high level logic flowchart of a process and computer program for a DAM service monitoring for database queries and determining whether the database query validates against security policies and, for database queries that validate against security policies, monitoring for database server responses, determining whether database server responses are from a dynamic query with a result set, and determining whether the responses from a dynamic query with a result set validate against security policies.
Figure 9:
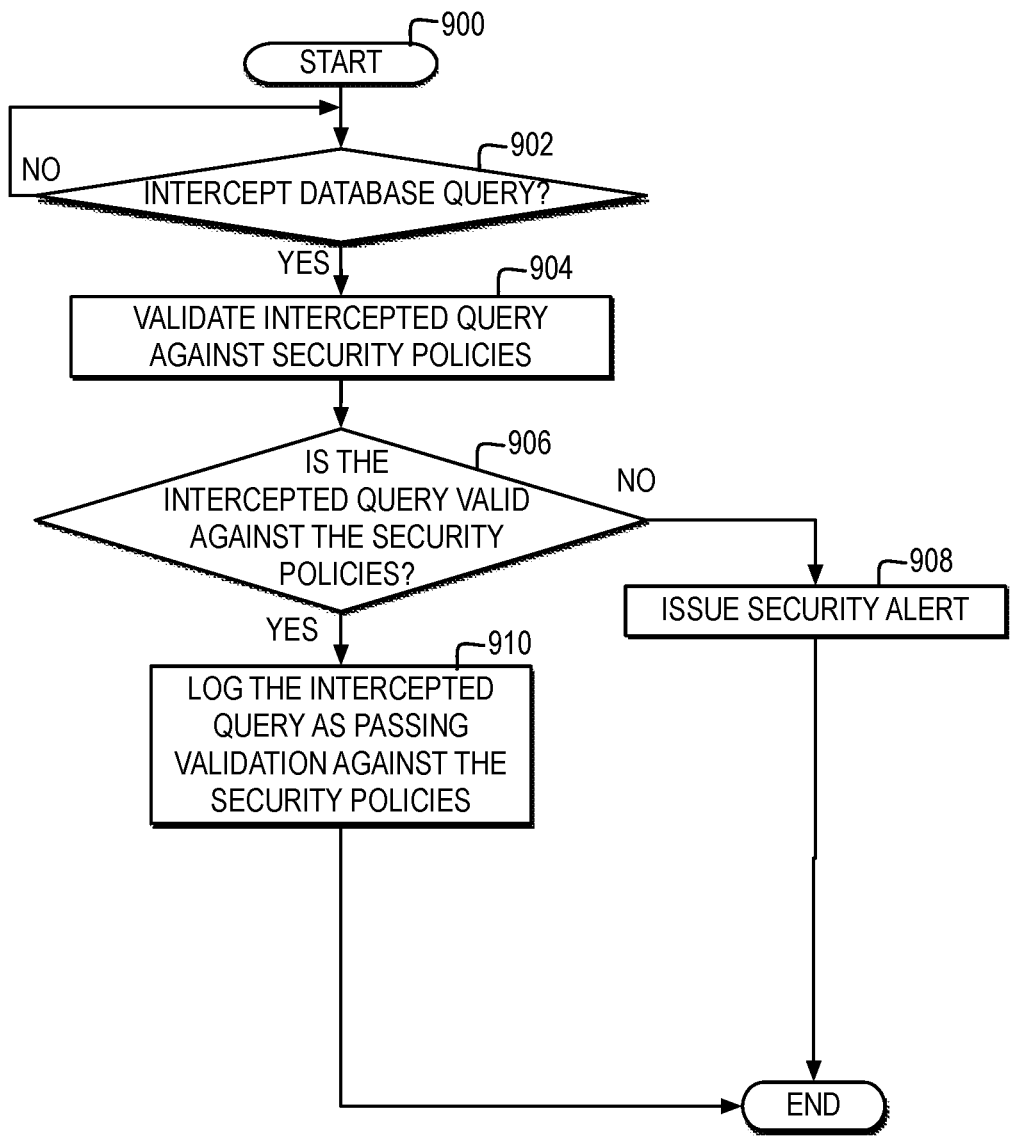
FIG. 9 is a high level logic flowchart of a process and computer program for a DAM service monitoring for database queries and determining whether the database query validates against security policies.
Figure 10:
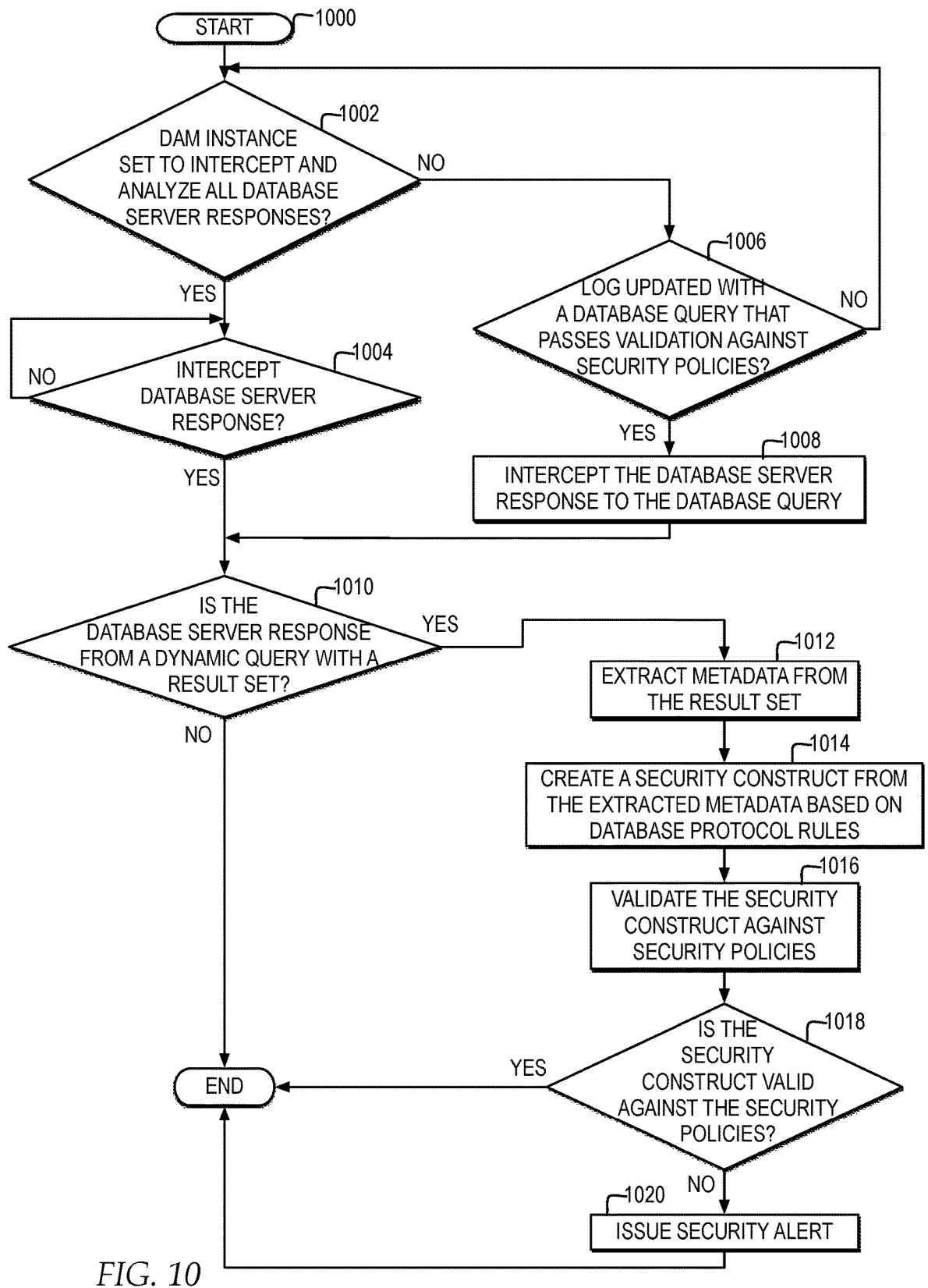
FIG. 10 is a high level logic flowchart of a process and computer program for a DAM service monitoring for database server responses, determining whether database server responses are from a dynamic query with a result set, and determining whether the responses from a dynamic query with a result set validate against security policies.

In one embodiment, the operations performed by processor 612 may control the operations of flowcharts of FIGS. 8-10 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowcharts in FIGS. 8-10.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

Figure 7:
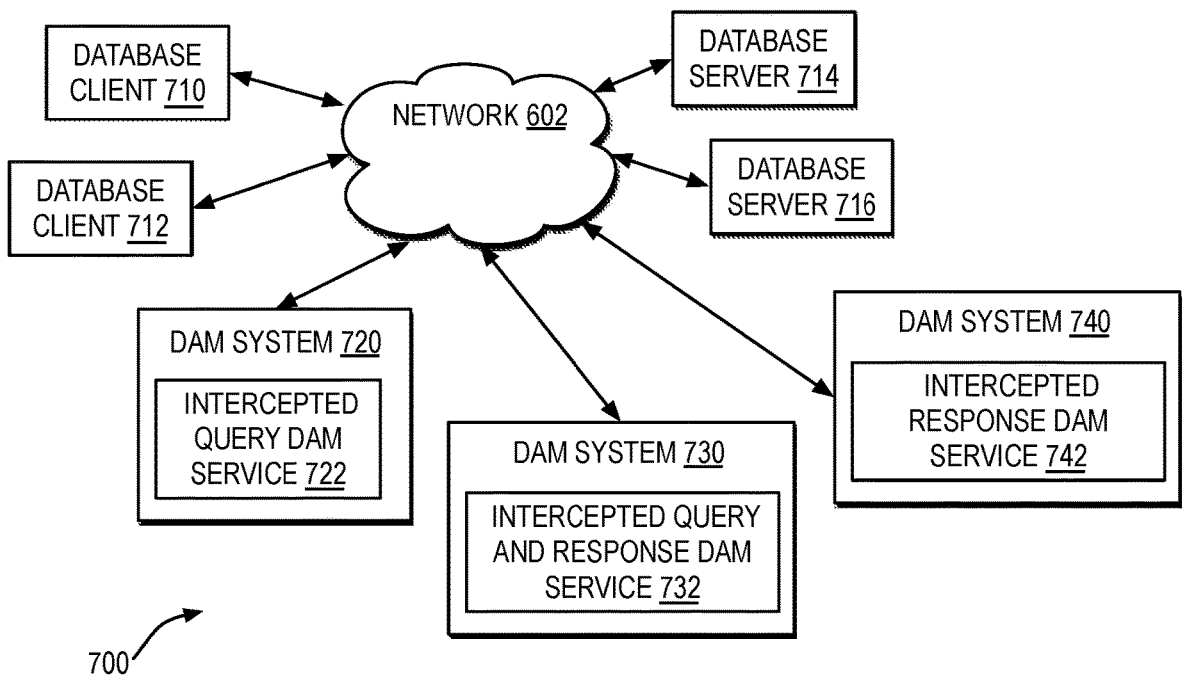
FIG. 7 is a block diagram illustrating a network environment in which DAM services may be implemented for providing instances of DAM services specified for one or more of intercepted query validation and intercepted database service response validation.

FIG. 7 illustrates a block diagram illustrating a network environment in which DAM services may be implemented for providing instances of DAM services specified for one or more of intercepted query validation and intercepted database service response validation.

In one example, a network environment 700 may include one or more database clients representative of database client 110, such as a database client 710 and a database client 712, and one or more database servers representative of database server 114, such as a database server 714 and a database server 716. In one example, each of database client 710 and database client 712 may communicate with one or more database severs, such as database server 114 and database server 116. In one example, database server 114 and database server 116 may represent systems running DBMS with a same protocol or different protocols. In the example, network 602 may represent any combination of connections and protocols that will support communication between each of the clients, servers and systems illustrated.

In one example, communications between each of database client 710 and database client 712 with one or more of database server 714 and database server 716 are monitored by one or more DAM services. In one example, a single DAM service may monitor communications between database clients and a single database server, such as database server 714, or multiple servers, such as both database server 714 and database server 716.

In one example, a DAM system 730 is communicatively connected via network 602 to monitor one or more of database server 714 and database server 716 through the functionality of an intercepted query and response DAM service 732. In one example, intercepted query and response DAM service 732 may provide the services for intercepting and validating both queries and database server responses as described with reference to DAM service 160 described in FIG. 1 and FIG. 4. In one example, intercepted query and response DAM service 732 may perform the operations of the flowchart in FIG. 8, for example. By implementing intercepted query and response DAM service 732 for monitoring database server 714, if database client 710 or database client 712 sends a dynamic SQL query to database server 714, while intercepted query and response DAM service 732 may validate an intercepted dynamic SQL query as passing against security policies for database server 714, intercepted query and response DAM service 732 may determine an intercepted database server response related to the dynamic SQL query fails to validate against security policies, and properly issue an alert for the dynamic SQL query.

In one example, a DAM system 720 is communicatively connected via network 602 to monitor one or more of database server 714 and database server 716 through the functionality of an intercepted query DAM service 722. In one example, intercepted query DAM service 722 may provide the services for intercepting and validating queries only as described with reference to DAM service 160 described in FIG. 1. In one example, intercepted query DAM service 722 may perform the operations of the flowchart in FIG. 9, for example. By implementing intercepted query DAM service 722 for monitoring database server 714, if database client 710 or database client 712 sends a dynamic SQL query to database server 714, intercepted query DAM service 722 may validate an intercepted dynamic SQL query as passing against security policies for database server 714 and log the intercepted query as passing. In one example, intercepted query DAM service 722 may represent an existing DAM service that implements logs, flags, or other settings to mark that an query has been intercepted and not triggered an alert.

In one example, a DAM system 740 is communicatively connected via network 602 to monitor one or more of database server 714 and database server 716 through the functionality of an intercepted response DAM service 742. In one example, intercepted response DAM service 742 may provide the services for intercepting and validating database server responses only as described with reference to DAM service 160 described in FIG. 4. In one example, intercepted query DAM service 742 may perform the operations of the flowchart in FIG. 10, for example. By implementing intercepted query DAM service 742 for monitoring database server 714, if database client 710 or database client 712 sends a dynamic SQL query to database server 714, response DAM service 742 may determine an intercepted database server response related to a dynamic SQL query fails to validate against security policies, and properly issue an alert for the dynamic SQL query.

In one example, intercepted query DAM service 722 and intercepted response service 742 may be provided as separate services, but communicatively connected, to provide the functionality of intercepted query and response DAM service 732. In another example, intercepted query DAM service 722 and intercepted response service 742 may be provided as separate services, but intercepted response DAM service 742 may access a log recorded by intercepted query DAM service 722 and select to only intercept and analyze database server responses related to database queries logged or otherwise marked by intercepted query DAM service 722 as not triggering an alert. In another example, intercepted query DAM service 722 may intercept and monitor all database server responses from database server 714 in response to queries.

FIG. 8 illustrates a high level logic flowchart of a process and computer program for a DAM monitoring for database queries and determining whether the database query validates against security policies and, for database queries that validate against security policies, monitoring for database server responses, determining whether database server responses are from a dynamic query with a result set, and determining whether the responses from a dynamic query with a result set validate against security policies.

As illustrated, in one example, a process and computer program begin at block 800 and thereafter proceed to block 802. Block 802 illustrates validating an intercepted database query against security policies. In one example, validating an intercepted database query against security policies may include steps of parsing the database query, creating a security construct from the parsed data based on database protocol rules, and validating the security construct against the security policies. Next, block 804 illustrates a determination whether the intercepted database query is valid against the security policies. At block 804, if the intercepted query is not valid against the security policies, then the process passes to block 818. Block 818 illustrates issuing a security alert, and the process ends.

Returning to block 804, if the intercepted query is valid against the security policies, then the process passes to block 806. Block 806 illustrates intercepting a database server response to the database query. Next, block 808 illustrates a determination whether the database server response is from a dynamic query with a result set. At block 808, if the database server response is not from a dynamic query with a result set, then the process ends. At block 808, if the database server response is from a dynamic query with a result set, then the process passes to block 810. Block 810 illustrates extracting metadata from the result set. Next, block 812 illustrates creating a security construct from the extracted metadata based on database protocol rules. Thereafter, block 814 illustrates validating the security construct against security policies, and the process passes to block 816.

Block 816 illustrates a determination whether the security construct is valid against the security policies. At block 816, if the security construct is valid against the security policies, then the process ends. At block 816, if the security construct is not valid against the security policies, then the process passes to block 818. Block 818 illustrates issuing a security alert, and the process ends.

FIG. 9 illustrates a high level logic flowchart of a process and computer program for a DAM service monitoring for database queries and determining whether the database query validates against security policies.

As illustrated, in one example, a process and computer program begin at block 900 and thereafter proceed to block 902. Block 902 illustrates a determination whether a database query sent by a database client to a database server is intercepted. At block 902, if a database query is intercepted, then the process passes to block 904. Block 904 illustrates validating the intercepted query against security policies. In one example, validating an intercepted database query against security policies may include steps of parsing the database query, creating a security construct from the parsed data based on database protocol rules, and validating the security construct against the security policies. Next, block 906 illustrates a determination whether the intercepted query is valid against the security policies. At block 906, if the intercepted query is not valid against the security policies, then the process passes to block 908. Block 908 illustrates issuing a security alert, and the process ends. Returning to block 906, if the intercepted query is valid against the security policies, then the process passes to block 910. Block 910 illustrates logging the intercepted query as passing validation against the security policies, and the process ends. In logging the intercepted query as passing validation against the security policies, the intercepted query may also be flagged for the database server response of the intercepted query to be intercepted and analyzed. In additional or alternate embodiments, FIG. 9 may include additional or alternate processes for parsing and analyzing intercepted database queries.

FIG. 10 illustrates a high level logic flowchart of a process and computer program for a DAM monitoring for database server responses, determining whether database server responses are from a dynamic query with a result set, and determining whether the responses from a dynamic query with a result set validate against security policies.

As illustrated, in one example, a process and computer program begin at block 1000 and thereafter proceed to block 1002. Block 1002 illustrates a determination whether a DAM instance is set to intercept and analyze all database server responses. At block 1002, if the DAM instance is set to intercept and analyze all database server responses, then the process passes to block 1004. In one example, if the DAM instance is set to intercept and analyze all database server responses, the interception module monitors for and intercepts responses to all database server queries. Block 1004 illustrates a determination whether a database server response is intercepted. At block 1004, if a database server response is intercepted, then the process passes to block 1010.

Returning to block 1002, if a DAM instance is not set to intercept and analyze all database server responses, then the process passes to block 1006. Block 1006 illustrates a determination whether a log is updated with a database query that passes validation against security policies. In one example, one DAM instance may monitor a log of database queries that pass validation against security policies as updated by another DAM instance. At block 1006, if a log is not updated with a database query that passes validation against security policies, the process returns. At block 1006, if a log is updated with a database query that passes validation against security policies, then the process passes to block 1008. Block 1008 illustrates intercepting the database server response to the passing database query, and the process passes to block 1010.

Block 1010 illustrates a determination whether the database server response is from a dynamic query with a result set. At block 1010, if the database server response is not from a dynamic query with a result set, then the process ends. At block 1010, if the database server response is from a dynamic query with a result set, then the process passes to block 1012. Block 1012 illustrates extracting metadata from the result set. Next, block 1014 illustrates creating a security construct from the extracted metadata based on database protocol rules. Thereafter, block 1016 illustrates validating the security construct against security policies, and the process passes to block 1018.

Block 1018 illustrates a determination whether the security construct is valid against the security policies. At block 1018, if the security construct is valid against the security policies, then the process ends. At block 1018, if the security construct is not valid against the security policies, then the process passes to block 1020. Block 1020 illustrates issuing a security alert, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:
1. A method comprising:
in response to intercepting, by a computer system, a database server response with a result set issued from a database server in response to a database query received by the database server from a plurality of database clients, extracting a selection of data from the result set, the selection of data identifying a plurality of dynamic query elements of a dynamic database query as constructed from the database query by the database server at runtime;

determining, by the computer system, whether the plurality of dynamic query elements comply with a plurality of security policies by:

creating, by the computer system, a security construct for the plurality of dynamic query elements from the extracted first selection of data based on particular database protocol rules specified for the database server from among a plurality of database protocol rules; and validating, by the computer system, the security construct against the plurality of security policies specifying restrictions on a particular type of access operation to a particular database object by a particular user; and in response to determining that the plurality of dynamic query elements fail to comply with at least one of the plurality of security policies, issuing, by the computer system, a security alert.

2. The method according to claim 1, wherein extracting the selection of data from the result set, the selection of data identifying the plurality of dynamic query elements of the dynamic database query as constructed from the database query by the database server at runtime further comprises:

extracting, by the computer system, the selection of data from the result set in a database protocol packet of the database server response to the dynamic database query, the result set comprising the selection of data comprising metadata identifying the plurality of dynamic query elements and comprising a second selection of data comprising data values returned by the database server in the result set in response to executing the dynamic database query.

3. The method according to claim 2, wherein extracting, by the computer system, the selection of data from the result set in the database protocol packet of the database server response to the dynamic database query, the result set comprising the selection of data comprising the metadata identifying the plurality of dynamic query elements and comprising the second selection of data comprising data values returned by the database server in the result set in response to executing the dynamic database query further comprises:

extracting, by the computer system, the selection of data comprising the metadata from the result set in the database protocol packet, wherein the metadata is invisible in the output of the result set in a user interface of a database client application submitting the dynamic database query, wherein the second selection of data is visible to the user interface of the database client application.

4. The method according to claim 2, wherein extracting, by the computer system, the selection of data from the result set in the database protocol packet of the database server response to the dynamic database query, the result set comprising the selection of data comprising the metadata identifying the plurality of dynamic query elements and comprising the second selection of data comprising data values returned by the database server in the result set in response to executing the dynamic database query further comprises:

extracting, by the computer system, the selection of data comprising the metadata from the result set in the database protocol packet, the database protocol packet issued in a particular database protocol format implemented by the database server from among a plurality of database protocol formats, the plurality of dynamic query elements further comprising a plurality of database column identifiers, a database name identifier, and an object owner identifier.

5. The method according to claim 1, further comprising:

intercepting, by the computer system, the database query sent by a particular database client application from among the plurality of database clients to the database server, the database query representing the dynamic database query prior to construction by the database server at runtime, the intercepting performed without interfering with a communication of the database query to the database server;

parsing, by the computer system, the database query to a database object level to identify the plurality of database objects in the database query;

creating, by the computer system, a first security construct from the plurality of database objects;

determining, by the computer system, whether the first security construct created from the database query complies with the plurality of security policies;

in response to determining that the first security construct created from the database query fails to comply with at least one of the plurality of security policies, issuing, by the computer system, a security alert for the database query;

only selecting to intercept, by the computer system, the database server response to the database query, in response to determining that the first security construct created from the database query comply with the plurality of security policies; and determining, by the computer system, whether the database server response comprises the result set associated with the dynamic database query resulting from the database query.

6. The method according to claim 5, further comprising:

detecting, by the computer system, whether a log is updated indicating the security construct created from the database query is determined to comply with the plurality of security policies;

only selecting to intercept, by the computer system, the database server response to the database query, in response to detecting the log is updated; and determining, by the computer system, whether the database server response comprises the result set associated with the dynamic database query resulting from the database query.

7. The method according to claim 1, further comprising:

intercepting, by the computer system, by a service independent of the database server, the database server response issued by the database server to a database client application from among the plurality of database clients comprising the result set associated with the dynamic database query submitted by the database client application to the database server, the service intercepting the database server response at a transmission point between the database server and the database client application over a network, the transmission point independent of an audit log of activity of the database server maintained by the database server.

8. The method according to claim 1, further comprising:

intercepting, by the computer system, a database session and a user identifier on a database session level during database user authentication between a particular client of the plurality of database clients and the database server; and identifying, by the computer system, the query and the database server response by the database session associated with the user identifier, the user identifier identifying the particular user.

9. A computer system comprising at least one processor, at least one computer-readable memory, at least one computer-readable storage device, and program instructions, stored on the at least one storage device for execution by at least one processor via the at least one computer-readable memory, the stored program instructions comprising:
    program instructions to, in response to intercepting a database server response with a result set issued from a database server in response to a database query received by the database server from a plurality of database clients, extracting a selection of data from the result set, the selection of data identifying a plurality of dynamic query elements of a dynamic database query as constructed from the database query by the database server at runtime;
    program instructions to determine whether the plurality of dynamic query elements comply with a plurality of security policies by:
        creating a security construct for the plurality of dynamic query elements from the extracted first selection of data based on particular database protocol rules specified for the database server from among a plurality of database protocol rules; and
        validating the security construct against the plurality of security policies specifying restrictions on a particular type of access operation to a particular database object by a particular user; and
    program instructions to, in response to determining that the plurality of dynamic query elements fail to comply with at least one of the plurality of security policies, issue a security alert.

10. The computer system according to claim 9, the stored program instructions further comprising:
    program instructions to extract the selection of data from the result set in a database protocol packet of the database server response to the dynamic database query, the result set comprising the selection of data comprising metadata identifying the plurality of dynamic query elements and comprising a second selection of data comprising data values returned by the database server in the result set in response to executing the dynamic database query.

11. The computer system according to claim 10, the stored program instructions further comprising:
    program instructions to extract the selection of data comprising the metadata from the result set in the database protocol packet, wherein the metadata is invisible in the output of the result set in a user interface of a database client application submitting the dynamic database query, wherein the second selection of data is visible to the user interface of the database client application.

12. The computer system according to claim 10, the stored program instructions further comprising:
    program instructions to extract the first selection of data comprising the metadata from the result set in the database protocol packet, the database protocol packet issued in a particular database protocol format implemented by the database server from among a plurality of database protocol formats, the plurality of dynamic query elements further comprising a plurality of database column identifiers, a database name identifier, and an object owner identifier.

13. The computer system according to claim 9, the stored program instructions further comprising:
    program instructions to intercept the database query sent by a particular database client application from among the plurality of database clients to the database server, the database query representing the dynamic database query prior to construction by the database server at runtime, the intercepting performed without interfering with a communication of the database query to the database server;
    program instructions to parse the database query to a database object level to identify a plurality of database objects in the database query;
    program instructions to create a first security construct from the plurality of database objects;
    program instructions to determine whether the first security construct created from the database query complies with the plurality of security policies;
    in response to determining that the first security construct created from the database query fails to comply with at least one of the plurality of security policies, program instructions to issue a security alert for the database query;
    program instructions to only select to intercept the database server response to the database query, in response to determining that the first security construct created from the database query comply with the plurality of security policies; and
    program instructions to determine whether the database server response comprises the result set associated with the dynamic database query resulting from the database query.

14. The computer system according to claim 13, the stored program instructions further comprising:
    program instructions to detect whether a log is updated indicating the security construct created from the database query is determined to comply with the plurality of security policies;
    program instructions to only select to intercept the database server response to the database query, in response to detecting the log is updated; and
    program instructions to determine whether the database server response comprises the result set associated with the dynamic database query resulting from the database query.

15. The computer system according to claim 9, the stored program instructions further comprising:
    program instructions to intercept, by a service independent of the database server, the database server response issued by the database server to a database client application from among the plurality of database clients comprising the result set associated with the dynamic database query submitted by the database client application to the database server, the service intercepting the database server response at a transmission point between the database server and the database client application over a network, the transmission point independent of an audit log of activity of the database server maintained by the database server.

16. The computer system according to claim 9, the stored program instructions further comprising:
    program instructions to intercept a database session and a user identifier on a database session level during database user authentication between a particular client of plurality of database clients and the database server; and program instructions to identify the query and the database server response by the database session associated with the user identifier, the user identifier identifying the particular user.

17. A computer program product comprising at least one computer-readable storage device and program instructions, stored on the at least one computer-readable storage device, the stored program instructions comprising:
program instructions to, in response to intercepting a database server response with a result set issued from a database server in response to a database query received by the database server from a plurality of database clients, extracting a selection of data from the result set, the selection of data identifying a plurality of dynamic query elements of a dynamic database query as constructed from the database query by the database server at runtime;
program instructions to determine whether the plurality of dynamic query elements comply with a plurality of security policies by:
creating a security construct for the plurality of dynamic query elements from the extracted first selection of data based on particular database protocol rules specified for the database server from among a plurality of database protocol rules; and
validating the security construct against the plurality of security policies specifying restrictions on a particular type of access operation to a particular database object by a particular user; and
program instructions to, in response to determining that the plurality of dynamic query elements fail to comply with at least one of the plurality of security policies, issue a security alert.

18. The computer program product according to claim 17, the stored program instructions further comprising:
program instructions to extract the selection of data from the result set in a database protocol packet of the database server response to the dynamic database query, the result set comprising the selection of data comprising metadata identifying the plurality of dynamic query elements and comprising a second selection of data comprising data values returned by the database server in the result set in response to executing the dynamic database query.

19. The computer program product according to claim 18, the stored program instructions further comprising:
program instructions to extract the selection of data comprising the metadata from the result set in the database protocol packet, wherein the metadata is invisible in the output of the result set in a user interface of a database client application submitting the dynamic database query, wherein the second selection of data is visible to the user interface of the database client application.

20. The computer program product according to claim 18, the stored program instructions further comprising:
program instructions to extract the selection of data comprising the metadata from the result set in the database protocol packet, the database protocol packet issued in a particular database protocol format implemented by the database server from among a plurality of database protocol formats, the plurality of dynamic query elements further comprising a plurality of database column identifiers, a database name identifier, and an object owner identifier.

* * * * *